United States Patent [19]

Gamblin

[11] 4,189,754

[45] Feb. 19, 1980

[54] GRAY TONE REPRODUCTION APPARATUS

[75] Inventor: Rodger L. Gamblin, Dayton, Ohio

[73] Assignee: The Mead Corporation, Dayton, Ohio

[21] Appl. No.: 963,291

[22] Filed: Nov. 24, 1978

[51] Int. Cl.[2] .......................... H04N 1/40; H04N 1/22

[52] U.S. Cl. .......................................... 358/296; 358/283; 358/284; 358/298

[58] Field of Search ............... 358/296, 298, 283, 263, 358/78, 284

[56] References Cited

U.S. PATENT DOCUMENTS

| | | | |
|---|---|---|---|
| 3,580,995 | 5/1971 | Klensch | 358/283 |
| 3,604,846 | 9/1971 | Behane | 358/296 |
| 3,977,007 | 8/1976 | Berry et al. | 358/298 |
| 4,032,978 | 6/1977 | Wong | 358/283 |
| 4,033,443 | 7/1977 | Bunge et al. | 358/283 |
| 4,051,538 | 9/1977 | Fox et al. | 358/296 |
| 4,084,259 | 4/1978 | Cahill et al. | 358/296 |
| 4,112,469 | 9/1978 | Paranjpe et al. | 358/296 |
| 4,155,103 | 5/1979 | Gamblin et al. | 358/296 |

*Primary Examiner*—Alfred H. Eddleman
*Attorney, Agent, or Firm*—Biebel, French & Nauman

[57] ABSTRACT

A spirally interlacing jet drop recorder prints gray tones on a recording sheet mounted upon a rotating drum. The number of jets and the jet spacing is selected in such a manner as to facilitate time sharing of a matrix pattern memory by control circuits controlling operation of each of the jets. Matrices representing the gray levels to be produced are progressively printed from column to column by different ones of the array of jets.

16 Claims, 5 Drawing Figures

GRAY TONE REPRODUCTION APPARATUS

BACKGROUND OF THE INVENTION

This invention relates generally to gray tone reproduction and has particular application to gray tone reproduction utilizing an ink jet printer of the general type described in Sweet et al U.S. Pat. No. 3,373,437. As disclosed in the Sweet et al patent, gray tones may be reproduced by controlling the rate at which drops are deposited upon a moving web. Behane et al U.S. Pat. No. 3,604,846 teaches an improved gray scale reproduction technique wherein drops are deposited at various positions within a two dimensional matrix in accordance with the gray level to be reproduced. Variations on the matrix approach are disclosed in Berry et al U.S. Pat. No. 3,977,007 and in Wong U.S. Pat. No. 4,032,978.

This invention applies more particularly to an ink jet printer of the type taught by Paranjpe et al in U.S. Pat. No. 4,112,469. In printers of that type there is provided a print head having a row of spaced jets which are scanned across a recording member in the form of a sheet mounted upon a rotating drum. The scanning is carried out by transporting the print head axially along the length of the drum in such a manner as to cause spiral interlacing of the printed tracks produced upon the sheet by the different jets. As taught by Paranjpe et al, spiral interlacing may be achieved by providing the print head with any convenient number of jet producing nozzles and separating those nozzles by an appropraite integral number of printing track widths. An "appropriate" integral number is any number which has no factor other than 1 as a common factor with the number of nozzles. As also taught by Paranjpe, the print head should be axially advanced at a speed such that during one rotation of the drum, the axial advance is equal to the width of one printed track, multiplied by a number equal to the number of nozzles. Printing control is accomplished by simultaneously scanning a document, which is positioned upon a document plane, and sweeping an image of the document past a line of photocells arranged in correspondence with the arrangement of jet printing nozzles. Each photocell is connected to switch an associated jet into a catching position whenever the observed light level from the document is above some predetermined threshold.

This invention also has application to a spirally interlacing printer of the type disclosed in Fox U.S. Pat. No. 4,069,486, which may include a plurality of rows of nozzles all spirally interlacing under control of data signals produced by an appropriately configured data system. Neither the Fox patent or Paranjpe et al teach any method for operating such spirally interlacing rows of jets to reproduce gray levels appearing on the original document.

Other techniques for controlling an ink jet printer to reproduce gray tones are disclosed in Loughren U.S. Pat. No. RE27,555, Loughren U.S. Pat. No. 3,476,874, Chen U.S. Pat. No. 3,846,800, Sagae et al U.S. Pat. No. 3,928,718, Berry U.S. Pat. No. 4,065,773, and in Hertz et al U.S. Pat. No. 3,416,153. These latter patents generally relate to methods for controlling the rate at which ink is deposited at a given location on a recording medium.

SUMMARY OF THE INVENTION

According to the present invention gray level matrix patterns are printed by an arrangement of marking elements which are positioned so as to extend progressively in the widthwise direction along a print receiving sheet mounted on a support member. Transport means are provided for repetitively transporting the recording sheet in the heightwise direction across the active region of the marking elements. Other transport means produce relative movement of the marking elements in the widthwise direction so as to produce interlacing of the tracks which the marking elements print on the recording sheet. The number of marking elements is selected in such a manner as to differ by 1 from the product produced when the number of columns in any marking matrix is multiplied by any positive, non-zero integer. Also, the spacing between the marking elements is equal to the width of one of the matrices divided by any non-zero positive integer, which evenly divides the number of columns in a matrix.

Further in accordance with the practice of this invention each of the marking elements is provided with a density code generator for generating gray scale codes representative of gray levels to be printed and a shift register for storing bit strings representing columns of dots to be printed. The bit strings comprising all possible dot columns are stored in a common memory for writing out to each of the shift registers on a time sharing basis. A rotation counter cooperates with the density code generators to generate addresses for those bit strings which are to be written out to the shift registers.

In preferred embodiment the recording sheet is mounted on a rotating drum, and the marking elements are drop streams generated by a jet print head. Also in preferred embodiment the density code generators comprise sensing elements which are arranged in correspondence with the arrangement of the printing streams and which observe an original image which is scanned therepast.

It is therefore an object of the invention to provide apparatus for interlaced printing of matrix patterns representing the gray levels in an image to be recorded.

It is another object of the invention to provide gray scale printing capability for a spirally interlacing jet drop recorder.

Other objects and advantages of the invention will be apparent from the following description, the accompanying drawings and the appended claims.

DESCRIPTION OF THE PREFERRED EMBODIMENTS

Figure 1:
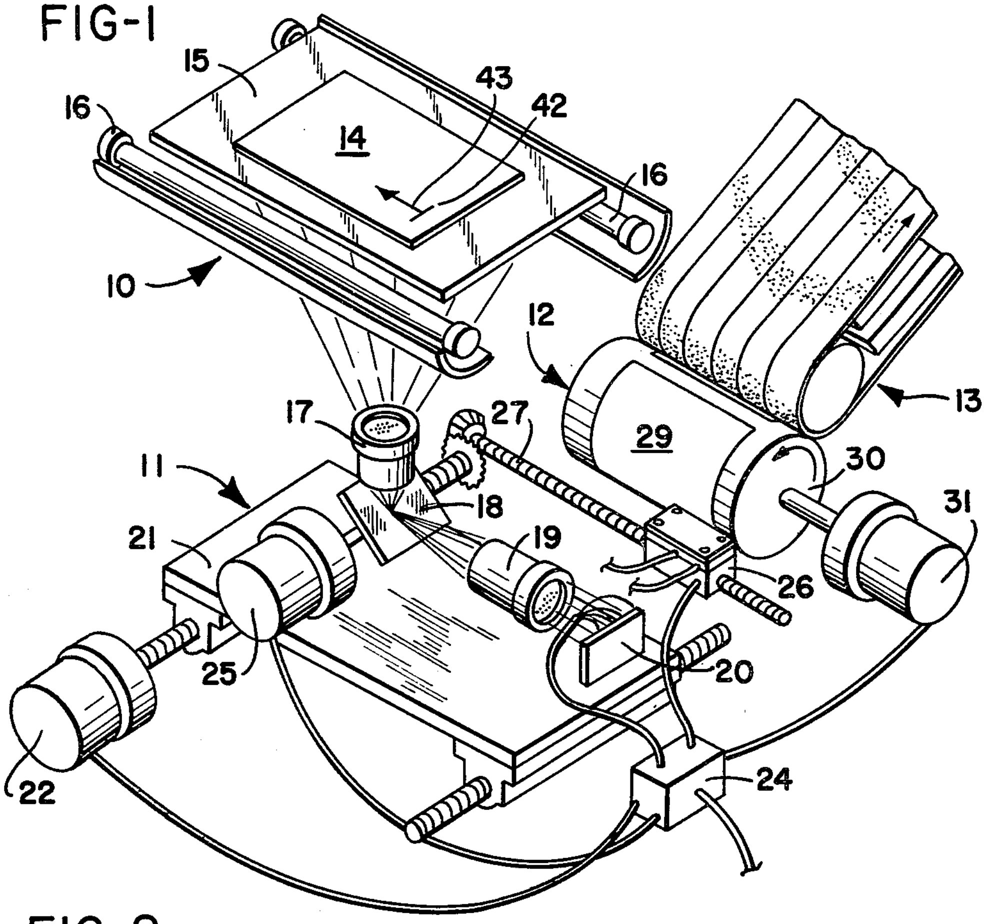
FIG. 1 is a pictorial illustration of an ink jet printing system configured for operation in accordance with this invention.

As generally illustrated in FIG. 1 a copier operating in accordance with this invention may comprise a document illumination station 10, a printing system 12, and a paper transport system 13. In order to produce one or more copies an original document 14 is placed flat on a planar support glass 15. A suitable control switch activates a pair of lamps 16 to illuminate document 14 for imaging by a scanning lens 17.

The image scanned by lens 17 is reflected from the surface of a rotating mirror 18 into a focusing lens 19 for imaging upon a photodiode array 20 positioned at the image plane of focusing lens 19. A line of individual photodiodes in the array 20 are spaced to observe spaced points along a line such as line 42. The rotation of mirror 18 causes the line of observed points to move in a direction as indicated by the arrow 43. For one embodiment as hereinafter described, there may be eighty-six individual photodiodes spaced to observe eighty-six points along the line 42. A typical spacing between photodiodes may be about 0.025 inches, center-to-center.

Figure 2:
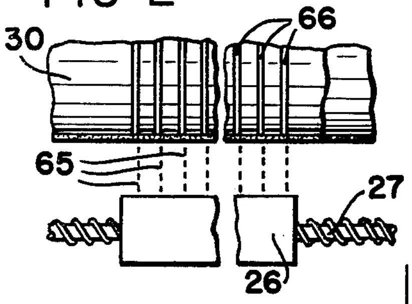
FIG. 2 is a schematic illustration of printing tracks simultaneously printed by a row of jets.

Scanning system 11 is supported by a table 21 driven by a synchronous drive motor 22 under control of a control unit 24. A jet drop print head 26 is transported axially along a worm 27 in synchronism with the movement of table 21. During this axial movement, print head 26 directs a series of jets 65 toward a recording sheet 29 mounted on a rotating drum 30. As taught in the above mentioned Paranjpe et al patent, the spacing of jets 65 corresponds to the spacing of the photodiodes in the array 20. The jets 65 print a series of tracks 66, as best illustrated in FIG. 2. Printing drum 30 is driven by a drive motor 31 under control of control unit 24 for movement in synchronism with the movement of mirror 18 and its drive motor 25. The recording sheet 29 is transferred between drum 30 and transport system 13 by transfer elements not illustrated in detail.

Figure 3:
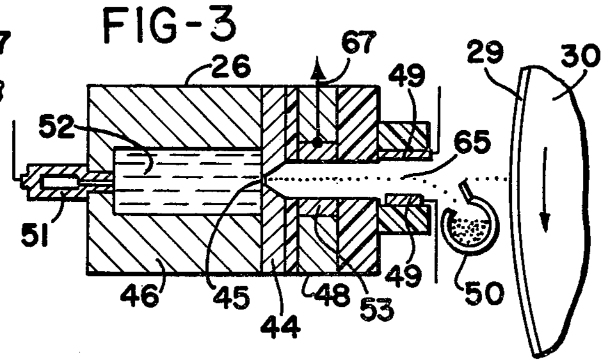
FIG. 3 is a cross sectional drawing of a jet drop print head.

Print head 26 generally comprises a fluid supply manifold 46, an orifice plate 44, a charge ring plate 48, deflection electrodes 49, and a catcher 50, all as illustrated in FIG. 3. The manifold 46 contains a supply of ink 52, which flows under pressure through orifices 45 to form the streams 65. Streams 65 comprise a series of uniformly sized and regularly spaced drops, which are generated under the control of a stimulator, as schematically illustrated at 51.

Charge plate 48 includes a series of electrodes 53, each of which is connected to a charging control line 67. As taught in the above mentioned Paranjpe et al patent and in prior art cited therein, the stream 65 can be controlled to deposit either upon the sheet 29 or into catcher 50 by applying control signals to the line 67.

Figure 4:
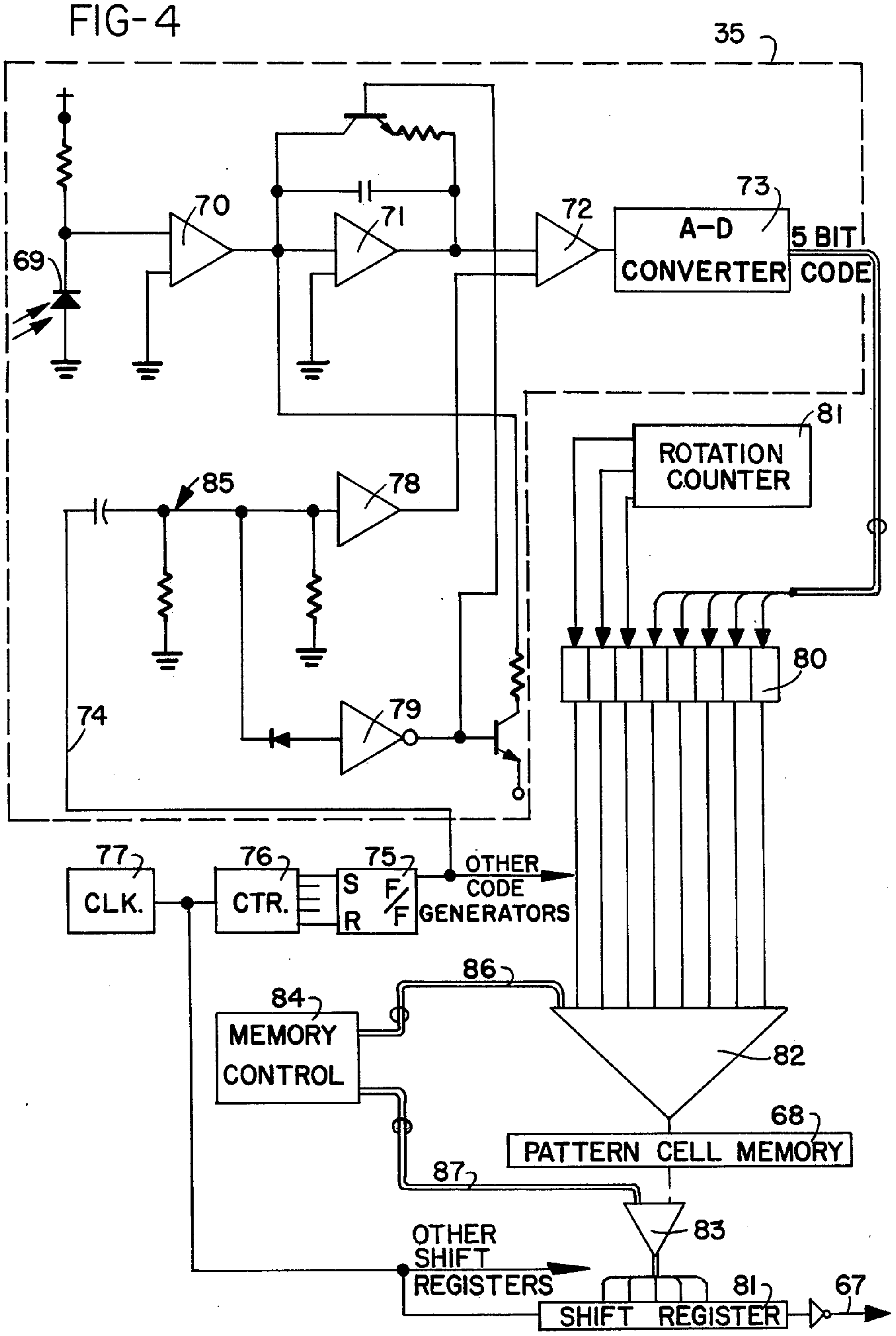
FIG. 4 is a schematic drawing of electrical circuitry for controlling one jet to reproduce gray levels.
Figure 5:
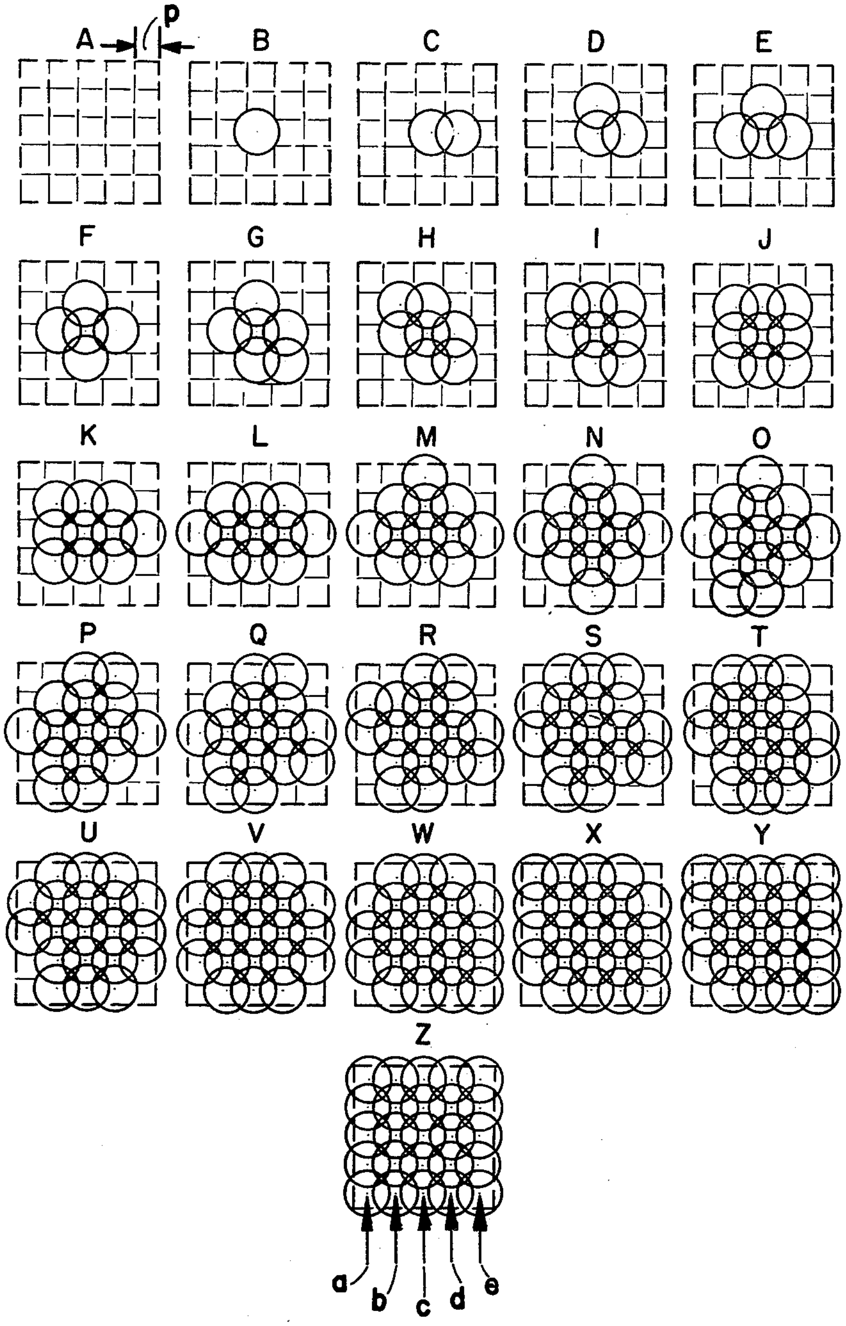
FIG. 5 is an illustration of twenty-six different matrix patterns which may be printed to reproduce twenty-six different gray levels.

FIG. 4 illustrates the control circuitry which generates printing control signals for the charge control line 67. Under control of that control circuitry, all of the lines 67 cause the jets 65 to print in a cooperative fashion such that different gray scales appearing on the document 29 are reproduced in matrix fashion. A series of matrix patterns, A through Z, for reproducing twenty-six gray levels ranging from white to black are illustrated in FIG. 5. Control unit 24 includes a memory 68 containing pattern information corresponding to the twenty-six patterns of FIG. 5. Memory 68 is addressed by rotation codes from a rotation counter 81 and by gray scale codes from a series of density code generators 35. Each jet has its own density code generator 35, and all jets share memory 68.

In order to enable such memory sharing, the jets 65 are spaced for simultaneous printing of corresponding columns from a field of matrices comprising the copy being printed. For example, a printed sheet may comprise a two dimensional field of matrices printed with different ones of the twenty-six different matrix patterns illustrated in FIG. 5. Each such matrix pattern is printed by a sequence of different jets, each printing columnar sets of dot patterns collectively comprising the overall matrix patterns. For 5×5 matrix patterns as illustrated in FIG. 5, the columnar dot patterns are printed within five-cell columns, which extend in the vertical or heightwise direction and which are positioned side-by-side in the widthwise direction. As illustrated in FIG. 5, the matrix columns have a width p and are designated from left to right by the designations a through e.

The rotation of drum 30 causes the jets to scan in the heightwise direction, while the translation of head 26 along worm 27 causes printing to progress in the widthwise direction, with sequential printing of the columns a through e. For printing the illustrated 5×5 matrices, the jets 65 have a center-to-center spacing of 5p. Thus if one jet is printing column a from one of the illustrated matrix patterns, all jets will be printing column a from that or another matrix pattern. Upon printing, these columnar patterns take on the form of the tracks 66 of FIG. 2.

The general spacing requirement of this invention requires that the jets, or other marking elements, be spaced in the widthwise direction at a spacing equal to the width of a marking matrix divided by any non-zero positive integer which evenly divides the number of columns comprising a matrix. Expressed in equation form:

$$s=p(m/I_1)$$

where m is the number of columns in a matrix pattern, p is the width of one column, s is the distance between the marking elements, and $I_1$ is the dividing integer.

From a practical design point of view, m and p are established by the nature of the graphics being reproduced, so the jet spacing s is the dependent variable. In the above case where m=5, there is no integer other than 1 which evenly divides m. Thus for the case of the example, s must have a value of 5p. If m had a value of 15 (i.e. 15×15 matrices), then the spacing of the marking elements could be any of 5p, 10p, or 15p corresponding respectively to $I_1$ values of 3, 2 or 1.

Further in order to print matrix patterns in accordance with this invention, the number of marking elements is selected in accordance with the equation:

$$n=I_2m\pm1$$

where n is the number of marking elements and $I_2$ is any positive non-zero integer. For the embodiment herein described, $I_2$ has a value of 17, so that there may be either 84 or 86 jets. Tabulated data are hereinafter set forth for both cases.

It may be demonstrated that the above limitations upon jet spacing and the number of jets are but a special case of the general teaching of Paranjpe et al in U.S. Pat. No. 4,112,469. The patent discloses that spiral interlacing of a row of jets may be achieved if the jets are spaced apart some number of track widths having no factor other than 1 as a common factor with the number of jets. The patent also discloses a further requirement that the advance speed of the print head must be so related to the drum rotation speed that during one rotation of the drum, the head moves a distance equal to the number of jets multiplied by the width of a printed track. This invention follows that teaching, so that in one special case, as hereinafter described, print head 26 advances along the worm 27 a distance 86p during one rotation of drum 30. In the other described special case the head 26 advances a distance 84p during the same period of time.

It will be appreciated that the selection of the number 17 as a value for $I_2$ is entirely arbitrary. The factor $I_2$ could just as easily have a value of 1, 2 or 3, which means that a five-column matrix may be printed by a row of 4, 6, 9, 11, 14 or 16 jets. As the number of jets increases the cost of the system also increases, but the time for producing a printed copy decreases.

Tables I and II present summaries of matrix printing operations for printing heads producing eighty-six and eighty-four jets respectively. The tables present printing information for a series of printing columns number from left to right across the axially extending dimension of print sheet 29. For each column there is presented the identification number of the stream which effects printing thereof, the rotation number for the rotation of drum 30 during which printing is accomplished, the identification number of the matrix encompassing that printing column (the matrices being numbered from left to right across the entire field of printing) and the designation of the matrix column which is being printed. In each case printing is commenced with the right hand stream printing the first or left hand printing column. At this time all other streams are positioned to the left of the print sheet 29 and are in a catching position. As a matter of convention, drum 30 is deemed to be rotating through rotation number 0 at the time when printing column number 1 is being printed.

Looking now at Table I it will be seen that stream number 86 prints matrix column a during rotation 0. This means that at all times during rotation 0, stream number 86 will print dot patterns from matrix column a of one of the twenty-six illustrated patterns A–Z of FIG. 5. During the time period between rotation 0 and rotation 1 print head 26 moves from left to right a distance equal to the width of eighty-six printing columns. Thus during rotation number 1, stream number 86 prints printing column number 87. During the course of this rotation stream 86 will print matrix column b from selected ones of the twenty-six matrix patterns, the printing being performed in the eighteenth matrix as numbered from left to right. Similarly stream 86 prints matrix columns c, d, and e on successive drum rotations.

In like manner stream number 69 prints a "b" matrix column within printing column number 2 during drum rotation number 1 and then on successive drum rotations prints matrix columns c, d, e, and a. The printing from all streams will be seen to interlace, and each stream moves progressively through the matrix column sequence from left to right with each rotation of drum 30. Moreover, as indicated by Table I all streams print common matrix columns during the same rotation of drum 30. Thus during rotation number 2, all streams then within the printing area of recording sheet 29 are printing matrix column c, as may be verified by looking at the tabulated data for printing column numbers 3, 8, 13, 18, 23, 88, and 173. This feature of common matrix column printing and progessive printing of matrix columns greatly simplifies the data handling system, as will be described in detail below.

Table I as described above, represents the type of progressive printing which occurs for the case where the number of jets is one greater than an number obtained by multiplying the number of matrix columns by a non-zero positive integer. For the case where the number of jets is one less than a number obtained by multiplying the number of matrix columns by a non-zero positive integer, reference may be made to Table II, which relates to the printing of 5-column matrices by an arrangement of 84 jets. For this arrangement, matrix column printing progresses from right to left, while print head 26 is physically transported from left to right. Thus during rotation number 1 all streams print "e" columns from various ones of the matrix patterns. On rotation number 2 all streams print "d" columns. This is followed by printing of "c", "b", and "a" columns on successive rotation. As shown in the table, printing of the five columns of the matrices occupying printing column Nos. 1–5 is accomplished by stream numbers 84, 17, 34, 51, and 68 during rotation numbers 0, 4, 3, 2, and 1 respectively. Thus it requires a total of five rotations of drum 30 to complete the printing of any given matrix on print sheet 29, but during this period of time the data for printing the matrices is processed in a relatively simple and convenient manner.

FIG. 4 illustrates data handling circuitry for conducting a printing process as described above with reference to Tables I and II. In general the data handling circuitry comprises memory 68, together with its input and output gating and a series of density code generators 35. Each density code generator 35 includes a photodiode 69, which for this example is one of 86 (or 84) photodiodes comprising the photosensor array 20. Photodiode 69 observes points along a series of lines on document 14; a new line of image information being observed with each rotation of mirror 18. The output signal from photodiode 69 varies in accordance with the amount of light being observed, which corresponds to the point to point variation in the gray level of the original document.

The output from photodiode 69 is amplified by amplifier 70 and supplied to Miller integrator 71, the output voltage of which has a slope equal to the level of the input voltage. The output from Miller integrator 26 is applied through gate 72 to an A to D convertor 73. Gating of signals through gate 72 is controlled by strobe pulses on line 74.

Strobe pulses on line 74 have a dwell time equal to the printing time for printing five cell positions comprising one of the matrix columns a—e illustrated in FIG. 5. The strobe signal is generated by flip-flop 75, which is set and reset by a modulo 5 counter 76. Counter 76 in turn counts individual cell pulses from a clock 77. Clock 77, counter 76 and flip-flop 75 serve all printing channels, while density code generator 35 is dedicated to a single channel.

The strobe pulses generated on line 74 are differentiated by a differentiating network 85, and the leading and trailing edge spikes are squared off to produce leading edge and trailing edge pules. The leading edge pulses appear at the output of amplifier 78 and are used to reset the Miller integrator. The trailing edge pulses appear at the output of amplifier 79 to gate the integrated value of the observed light level through gate 72 and into the A to D convertor 73.

The A to D converter 73 generates a five bit code representing one of the twenty-six matrix patterns of FIG. 5. This five bit code is supplied to a channel register 80, together with a three bit code from rotation counter 81. Rotation counter 81 is advanced one count for each rotation of drum 30, and the resulting output code represents one of the five matrix columns a–e. For the eight-six jet arrangement as herein described, the count proceeds in a forward direction for successive indication of columns a–e. For the alternative eighty-four jet arrangement, the rotation count proceeds in a reverse direction for indication of matrix columns e–a. The output of rotation counter 81 is reset after every fifth count.

As a result of the operation of rotation counter 81 and A to D converter 73, channel register 80 is loaded with codes representing the 130 columns comprising the twenty-six matrix patterns of FIG. 5. Bit strings corresponding to these 130 columns are stored in pattern cell memory 68 at addresses corresponding to the codes loaded into channel register 80. Addressing of pattern cell memory 68 is accomplished by a gating network 82, which operates under control of memory controller 84. Memory controller 84 generates counting signals on a series of lines as generally illustrated at 86 for sequential gating of addresses from 86 (or 84) channel registers 80 into pattern cell memory 68. The signals on the lines 86 are READ control signals which enable sharing of the pattern cell memory by all of the recording channels.

Output writing of bit strings from pattern cell memory is also under control of memory controller 84, output writing being controlled by WRITE control signals on a set of lines, generally illustrated at 87, which are applied to an output gating network 83. Each of the printing control lines 67 has an associated shift register 81 into which printing control bit strings are shifted. Memory controller 84 controls the READ/WRITE sequence such that each shift register 81 receives bit strings only from memory locations designated by its associated density code generator 35 (operating in cooperation with rotation counter 81).

Tables III and IV illustrate some of the bit strings which may be loaded into the shift registers 81. For example, if a density code generator 35 generates a density code corresponding to matrix pattern B of FIG. 5, then the associated shift register 81 will be loaded with one of the five codes listed in Tabel III. The five codes correspond to matrix columnS A–e, as selected by the output code from rotation counter 81. If the output code from density code generator 35 remains constant, then the same bit string will be read out repeatedly during one rotation of drum 30. Rotation counter 81 will cause the other strings tabulated in Table III to be read out on consecutive rotations of the drum, and the associated jet 65 will print corresponding patterns. Similarly the jet will carry out printing under control of the codes tabulated in Table IV when its density code generator 35 generates an address portion specifying matrix pattern D.

It will be understood that memory controller 84 generates eighty-six READ signals for gating network 82 and eighty-six WRITE signals for gating network 83 during the time that a five-bit string is being shifted out of shift register 81, this being necessary to enable time sharing of pattern cell memory 68 by eighty-six different recording channels. It will also be appreciated that the recording control signals shifted out of the shift registers 81 may control ON/OFF printing of pen recorders or other marking elements not specifically described herein. Furthermore the density control generators 35 may be any type of code generator capable of generating codes representing a series of different dot matrix patterns and may service marking elements which are arranged in a plurality of rows spaced around drum 30.

While the forms of apparatus herein described constitute preferred embodiments of the invention, it is to be understood that the invention is not limited to these precise forms of apparatus, and that changes may be made thereto without departing from the scope of the invention.

TABLE I

| Printing Column No. | Stream No. | Rotation No. | Matrix No. | Matrix Column |
|---|---|---|---|---|
| 1 | 86 | 0 | 1 | a |
| 2 | 69 | 1 | 1 | b |
| 3 | 52 | 2 | 1 | c |
| 4 | 35 | 3 | 1 | d |
| 5 | 18 | 4 | 1 | e |
| 6 | 1 | 5 | 2 | a |
| 7 | 70 | 1 | 2 | b |
| 8 | 53 | 2 | 2 | c |
| 9 | 36 | 3 | 2 | d |
| 10 | 19 | 4 | 2 | e |
| 11 | 2 | 5 | 3 | a |
| 12 | 71 | 1 | 3 | b |
| 13 | 54 | 2 | 3 | c |
| 14 | 37 | 3 | 3 | d |
| 15 | 20 | 4 | 3 | e |
| 16 | 3 | 5 | 4 | a |
| 17 | 72 | 1 | 4 | b |
| 18 | 55 | 2 | 4 | c |
| 19 | 38 | 3 | 4 | d |
| 20 | 21 | 4 | 4 | e |
| 21 | 4 | 5 | 5 | a |
| 22 | 73 | 1 | 5 | b |
| 23 | 56 | 2 | 5 | c |
| 24 | 39 | 3 | 5 | d |
| 25 | 22 | 4 | 5 | e |
| — | — | — | — | — |
| — | — | — | — | — |
| 87 | 86 | 1 | 18 | b |
| 88 | 69 | 2 | 18 | c |
| 89 | 52 | 3 | 18 | d |
| — | — | — | — | — |
| — | — | — | — | — |
| 173 | 86 | 2 | 35 | c |
| 174 | 69 | 3 | 35 | d |
| 175 | 52 | 4 | 35 | e |
| — | — | — | — | — |
| — | — | — | — | — |
| 259 | 86 | 3 | 52 | d |
| 260 | 69 | 4 | 52 | e |
| 261 | 52 | 5 | 53 | a |
| — | — | — | — | — |
| — | — | — | — | — |
| 345 | 86 | 4 | 69 | e |
| — | — | — | — | — |
| — | — | — | — | — |

TABLE II

| Printing Column No. | Stream No. | Rotation No. | Matrix No. | Matrix Column |
|---|---|---|---|---|
| 1 | 84 | 0 | 1 | a |
| 2 | 17 | 4 | 1 | b |
| 3 | 34 | 3 | 1 | c |
| 4 | 51 | 2 | 1 | d |
| 5 | 68 | 1 | 1 | e |
| 6 | 1 | 5 | 2 | a |
| 7 | 18 | 4 | 2 | b |
| 8 | 35 | 3 | 2 | c |
| 9 | 52 | 2 | 2 | d |
| 10 | 69 | 1 | 2 | e |
| 11 | 2 | 5 | 3 | a |
| 12 | 19 | 3 | 3 | b |
| — | — | — | — | — |
| — | — | — | — | — |
| 83 | 50 | 3 | 17 | c |
| 84 | 67 | 2 | 17 | d |
| 85 | 84 | 1 | 17 | e |
| 86 | 17 | 5 | 18 | a |

TABLE II-continued

| Printing Column No. | Stream No. | Rotation No. | Matrix No. | Matrix Column |
|---|---|---|---|---|
| 87 | 34 | 4 | 18 | b |
| 88 | 51 | 3 | 18 | c |
| — | — | — | — | — |
| — | — | — | — | — |
| 167 | 50 | 4 | 34 | b |
| 168 | 67 | 3 | 34 | c |
| 169 | 84 | 2 | 34 | d |
| 170 | 17 | 6 | 34 | e |
| 171 | 34 | 5 | 35 | a |
| 172 | 51 | 4 | 35 | b |
| — | — | — | — | — |
| — | — | — | — | — |
| 253 | 84 | 3 | 51 | c |
| — | — | — | — | — |
| — | — | — | — | — |
| 337 | 84 | 4 | 68 | b |

TABLE III

MATRIX B

| Column | Code |
|---|---|
| a | 00000 |
| b | 00000 |
| c | 00100 |
| d | 00000 |
| e | 00000 |

TABLE IV

MATRIX D

| Column | Code |
|---|---|
| a | 00000 |
| b | 00100 |
| c | 00110 |
| d | 00100 |
| e | 00000 |

What is claimed is:

1. Apparatus for recording graytones by selectively placing dots in commonly dimensional matrices, each of which comprises a series of m matrix columns of width p arranged side-by-side in a widthwise direction and extends vertically in a heightwise direction, said apparatus comprising:

(a) an arrangement of n marking elements progressively extending in the widthwise direction at a spacing equal to the width of one of said matrices divided by any non-zero positive integer which evenly divides the number m, (b) support means for supporting a print receiving sheet in marking relationship to said marking elements, (c) first transport means for repetitively transporting said recording sheet in the heightwise direction across the active region of said marking elements, (d) second transport means for causing relative movement of said marking elements in the widthwise direction across said marking elements at a speed such that there is a relative widthwise movement of the distance np during the period of one of said repetitive heightwise cycles.

(e) memory means for storing strings of bits corresponding to columnar sets of dot patterns collectively comprising a set of matrix patterns which when printed represent all gray levels to be recorded.

(f) counting means for counting said repetitive heightwise cycles and generating a counting code representative of said count, (g) a density code generator for generating a series of gray level codes representative of gray levels to be printed by said marking elements, (h) address means responsive to said counting codes and said gray level codes for generating addresses indicating the memory locations of said bit strings, (i) memory control means for causing the bit strings located at said addresses to be written out from said memory, and (j) shift register means for storing the bit strings written out from said memory and generating control signals for controlling the marking action of said marking elements;

said number n being selected according to the relationship:

$$n = Im \pm 1$$

where I is any positive non-zero integer and m is defined as aforesaid.

2. Apparatus according to claim 1 wherein said density code generator comprises a row of sensing elements for observing an image of an original document and a set of encoding devices responsive to the output of said sensing elements for generating said gray level codes.

3. Apparatus according to claim 2 wherein said sensing elements are arranged in correspondence with the arrangement of said marking elements.

4. Apparatus according to claim 3 wherein said shift register means comprises a separate shift register for each marking element.

5. Apparatus according to any of claims 1—4 wherein the spacing between said marking elements is equal to the width of one of said matrices.

6. Apparatus according to any of claims 1—4 wherein said marking elements are arranged along a single straight line extending in the widthwise direction.

7. Apparatus according to any of claims 1—4 wherein said support means comprises a cylindrical support surface curved about an axis extending in the widthwise direction, and said first transport means comprises means to rotate said surface about said axis.

8. Apparatus according to claim 7 wherein said marking elements comprise a series of drop generators, each capable of generating a continuous stream of drops of marking liquid and catching selected ones of said drops in response to said control signals.

9. Apparatus for recording graytones comprising a cylindrical surface curved about an axis extending in a widthwise direction, means for supplying a recording sheet to said surface, an arrangement of n marking progressively extending in the widthwise direction at a spacing s and positioned for placing printing marks within the cells of a field of two dimensional matrices collectively defining a printing area on a recording sheet mounted upon said surface, first transport means for rotating said surface and causing said marking elements to scan the surface of said sheet in a heightwise direction, second transport means for causing relative movement of said recording elements in the widthwise direction at a speed for causing spiral interlacing of tracks which are printed upon said sheet by said marking elements, and printing control means for controlling the printing operation of said marking elements; characterized in that the number n and the spacing s are selected according to the relationship:

$$n=I_2m\pm 1$$

and $$s=p(m/I_1)$$

where m is the number of heightwise extending columns collectively defining one of said matrices, p is the width of one of said columns, $I_2$ is any positive non-zero integer, and $I_1$ is any positive non-zero integer which evenly divides m.

10. Apparatus according to claim 9 characterized in that said printing control means comprises:

(a) memory means for storing strings of bits corresponding to columnar sets of patterns collectively comprising a set of matrix patterns which represent all gray levels to be recorded, (b) rotation counting means for counting rotations of said surface and generating a counting code representative of said count, (c) density code means for generating a series of gray level codes representative of gray levels to be printed by said marking elements, (d) address means responsive to said counting codes and said gray level codes for generating addresses indicating the memory locations of said bit strings, (e) memory control means for causing the bit strings located at said addresses to be written out from said memory, and (f) shift register means for storing the bit strings written out from said memory and generating control signals for controlling the marking action of said marking elements.

11. Apparatus according to claim 10 characterized in said density code means comprises a separate density code generator for each marking element.

12. Apparatus according to claim 11 characterized in that said shift register means comprises a separate shift register for each marking element.

13. Apparatus according to either of claims 11 or 12 characterized in that each such marking element comprises a sensing element for observing portions of an original image and an encoding device responsive to the output of said sensing element for generating gray level codes.

14. Apparatus according to claim 13 wherein the photosensors comprising said density code means are arranged in correspondence with the arrangement of said marking elements.

15. Apparatus according to claim 14 characterized in that said marking elements are arranged along a single straight line at a spacing equal to the width of one of said matrices.

16. Apparatus according to claim 15 characterized in that said marking elements comprise drop generators, each capable of generating a continuous stream of liquid marking drops and catching selected ones of said drops in response to said control signals.

* * * * *

UNITED STATES PATENT AND TRADEMARK OFFICE

CERTIFICATE OF CORRECTION

PATENT NO. : 4,189,754

DATED : February 19, 1980

INVENTOR(S) : Rodger L. Gamblin

It is certified that error appears in the above-identified patent and that said Letters Patent are hereby corrected as shown below:

Column 6, line 57, "pules" should be --pulses--.

Column 7, line 2, "eight-six" should be --eighty-six--.

Column 7, line 43, "columnS A-e" should be --columns a-e--.

Column 8, Table II, the Rotation No. "3" corresponding to Printing Column No. 12 should be changed to read --4--.

Signed and Sealed this

*Eighth* Day of *July 1980*

[SEAL]

*Attest:*

SIDNEY A. DIAMOND

*Attesting Officer* *Commissioner of Patents and Trademarks*